G. EVANS.
DENTAL INSTRUMENT.
APPLICATION FILED OCT. 15, 1921.
1,417,237.
Patented May 23, 1922.
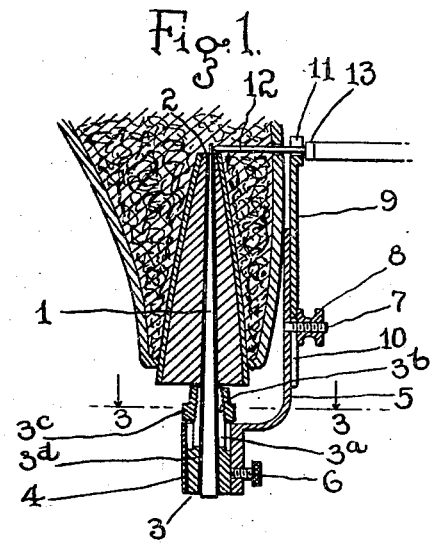
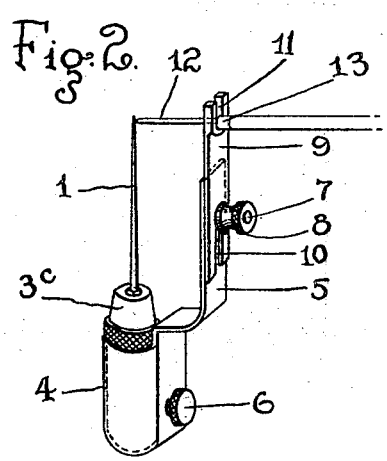
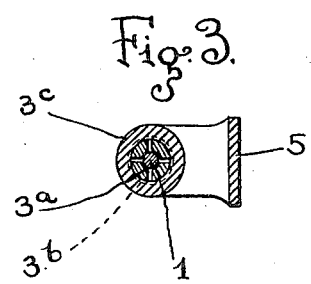
George Evans
Inventor
By his Attorney

UNITED STATES PATENT OFFICE.

GEORGE EVANS, OF NEW YORK, N. Y.

DENTAL INSTRUMENT.

1,417,237.   Specification of Letters Patent.   Patented May 23, 1922.

Application filed October 15, 1921. Serial No. 507,813.

*To all whom it may concern:*

Be it known that I, GEORGE EVANS, a citizen of the United States, residing at the borough of Manhattan, city, county, and State of New York, have invented certain new and useful Improvements in Dental Instruments, of which the following is a clear and exact specification.

This invention relates to dental surgery and my present improvement, which is in the nature of a development of my former application Serial No. 470243, filed May 17, 1921, is directed to means for determining the exact location of the root-apex of a tooth to permit the application of treatment at that point, as in the case of an abscess.

The apices of roots of the human teeth are imbedded in solid bone of the jaw, and when an abscess forms on the apex of one of these roots a small hole made through the bone to the apex of the root, and the abscess, will serve as a drainage vent and permit treatment of the lesion.

Prior to my said earlier application considerable difficulty was experienced in ascertaining the exact location of the root-apex, because no definite means were available to guide the operator, and often considerable destruction of bone occurred in the more or less hap-hazard efforts that were made for this purpose.

Therefore, my present invention like the said earlier application device consists of a measuring instrument, which I term an "apicometer," and which comprises a frame adapted to seat over the tooth or outer portion of the root whose apex is to be treated, said frame carrying length adjusting, and securing means for a probe or broach that is to be entered through the root canal to the point of emergence just beyond the root-apex. Said frame also has means whereby a guide member may be adjusted thereon to have co-incident length with the set length of the probe, in the same vertical plane, so that a drill, directed by said guide from the exterior of the jaw, may be caused to penetrate the bone exactly at right angles to the probe and when the latter has located the root-apex, thereby enabling the production of a drainage vent with mathematical precision.

A particular feature in the present application consists in the novel character of the length adjusting means for the probe or broach, these means comprising a tubular member, threaded at one end and there split into a number of tines, and a conoidal, interiorly threaded thimble to receive the tines, which are thereby contractible upon an inserted probe or broach. The tubular member is itself adapted to fit in a tubular portion of the frame, being secured therein by a set screw.

Other features of my invention will hereinafter appear.

In the drawing:—

Figure 1 is a vertical sectional view of a root as seated in the jaw, and with my improved measuring device adjusted in service.

Fig. 2 is a perspective elevation of the device, and

Fig. 3 is a detail of the probe holder.

In carrying out my invention, I place a broach 1 in the root canal and out through the apex 2 of the root. The broach or probe is held in a socket member 3 which is divided longitudinally for a portion of its length into the tines or fingers $3^a$, provided with the screw threads $3^b$ that are engaged by a threaded, conoidal thimble portion $3^c$ to contact the tines and thereby secure the broach or probe in a desired lengthwise adjustment. The shank or undivided portion $3^d$ of the socket member 3 is entered within a tube 4 from which there extends a flat bar 5, the end of which is curved to extend up over the surface of the gum covering the root of the tooth. Said tube 4 carries a screw 6 which secures it to the handle of the cone socket holder. On the portion of this flat bar where it extends over the gum is placed a screw 7 that extends outward from the bar and carries a nut 8. Over the upper section of the gum and locality of the root-apex is extended a supplementary flat bar 9, with a narrow, long slot 10 near its lower end, that permits it to be held, by screw 7 and nut 8, in position upon the bar 5 that is extended from the tube on the handle of the cone socket broach carrier.

This instrument in practical use is operated as follows:—The broach 1 is inserted up the root canal and the point thereof extended slightly through the apex of the root. The cone socket broach holder 3 is adjusted to the extending shank of the broach and against the end of the root and the broach fastened in position to the holder by tightening the screw section 3ᶜ of the cone socket.

The broach is removed from the root canal and the tube section 4 of the bar 5 is adjusted on the handle of the cone socket holder and secured by the screw 6 at the side. The supplementary bar section 9 next is so adjusted that the small slot 11 in its upper end will be at a right-angle line with the point of the broach. The upper bar is then secured in position by the nut 8 on the screw 7. A drill 12 is then inserted in the slot with the point of the drill touching the point of the broach, and by means of a small tube 13 or screw on the shank of the drill gauges the distance the drill has to go through the gum and bone of the jaw to reach the root-apex. By this means, when the instrument is placed back in position on the root, the slot in the supplementary bar will indicate the exact location on the root-apex and the spot on the surface of the gum to drill inward to reach the root-apex, while the gauge on the drill will define the distance.

Variations within the spirit and scope of my invention are equally comprehended by the foregoing disclosure:

I claim:—

1. A dental instrument comprising a cylindrical probe-holder, adapted to seat against a tooth or root end, means for securing a probe in the holder, a drill guide to direct a drill right angularly to the probe as entered through the root canal to intersect therewith at the root apex, and means for removably securing the guide to the probe holder.

2. In a dental instrument, in combination, a cylindrical holder having a series of tines that are exteriorly threaded, and an axial orifice for the reception of a probe, a conoidal member to engage the threaded tines and secure the probe in the holder with its length adjusted to measure the length of a root canal, a drill guide to direct a drill right angularly to the probe for intersection therewith at the root apex, and means for securing the guide to the probe holder.

3. In a dental instrument, in combination, a cylindrical holder having a flattened outer portion and an axial orifice for the reception of a probe, means for securing the probe in the holder with its length adjusted to measure the extent of a root canal, a socket member with an internal flat portion adapted to fit over the holder, means for securing the socket member to the holder, a bar extended from the socket member to lie alongside the gum, a supplementary bar having guide means for directing a drill into intersecting relation with the probe at the root apex, and means of lengthwise, adjustable engagement between the supplementary and extended bars.

Signed at New York, in the city, county and State of New York, this 11th day of October, 1921.

GEORGE EVANS.